(12) United States Patent
Jeong et al.

(10) Patent No.: US 7,447,180 B2
(45) Date of Patent: Nov. 4, 2008

(54) WIRELESS MEDIA ACCESS METHOD

(75) Inventors: Min-scop Jeong, Seoul (KR); Won-soo Kim, Yongin-si (KR); Jong-hun Park, Suwon-si (KR); Seung-hwan Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 11/055,495

(22) Filed: Feb. 11, 2005

(65) Prior Publication Data

US 2005/0180385 A1  Aug. 18, 2005

(30) Foreign Application Priority Data

Feb. 13, 2004  (KR)  ..................... 10-2004-0009766

(51) Int. Cl.
*H04B 7/216* (2006.01)
(52) U.S. Cl. ..................... 370/335; 370/350; 455/452.2
(58) Field of Classification Search ................. 370/282, 370/310, 330, 441–445, 335–340, 328, 329, 370/342, 350; 455/435.1–435.3, 450, 452.1, 455/452.2
See application file for complete search history.

(56) References Cited

U.S. PATENT DOCUMENTS

| 6,747,959 | B1 * | 6/2004 | Ho | ............................. 370/282 |
| 6,963,545 | B1 * | 11/2005 | Ho | ............................. 370/282 |
| 7,082,111 | B2 * | 7/2006 | Amouris | ..................... 370/321 |
| 2003/0018803 | A1 * | 1/2003 | El Batt et al. | ............... 709/236 |
| 2003/0058817 | A1 * | 3/2003 | Asai | ........................... 370/331 |
| 2003/0152059 | A1 * | 8/2003 | Odman | ....................... 370/338 |

* cited by examiner

*Primary Examiner*—Edward Urban
*Assistant Examiner*—Nhan T. Lee
(74) *Attorney, Agent, or Firm*—Sughrue Mion, PLLC

(57) ABSTRACT

The present invention is a wireless media access method on a wireless network synchronized by a synchronizing signal broadcasted from a coordinator. In the method, priority is assigned to a plurality of devices interconnected over the wireless network for securing wireless resources in accordance with application characteristics of a packet to be transmitted, and if the devices request communication, dividing at least one slot within a superframe into a plurality of minislots. Minislots are then allocated to the devices, respectively, according to the priority, and information about the allocated minislots is inserted into the synchronizing signal. The information is then broadcast, thereby allowing each of the devices with the allocated minislots to exclusively use the allocated minislot for data communication.

20 Claims, 5 Drawing Sheets

WIRELESS MEDIA ACCESS METHOD

CROSS-REFERENCE TO RELATED APPLICATIONS

This application claims priority under 35 U.S.C. § 119 from Korean Patent Application No. 2004-09766, filed on Feb. 13, 2004, the entire content of which is incorporated herein by reference.

BACKGROUND OF THE INVENTION

1. Field of the Invention

The present invention relates in general to a wireless media access method, more particularly, to a wireless media access method for preventing retransmission due to a high collision rate on a PAN (Personal Area Network) where node integration is high.

2. Description of the Related Art

A PAN (Personal Area Network), unlike a LAN or WAN, is a personal network owned by a personal individual. In other words, various devices are interconnected to construct a network exclusively for a personal use. The implementation of the PAN is a WPAN (Wireless Personal Area Network).

Currently, the IEEE 802.15.3 TG (Task Group) is developing a new standard for the WPAN technology. The IEEE 802.15.3 specifies raw data rates of 11 to 55 Mbps at distances within 10 meters without consuming much power. The IEEE 802.15.3a TG is now trying to develop a higher-rate physical layer, 100 Mbps for example, for the IEEE 802.15.3. Particularly, the IEEE 802.15.3a can be applied to wireless transmission of multimedia (e.g., moving images) within a short distance. Meanwhile, the IEEE 802.15.4 TG is aimed at developing standards for inexpensive, low-powered communication, which can be mainly applied to monitoring and control systems.

The basic unit of the WPAN is a piconet constructed of at least one device (DEV) sharing a single network identifier with a piconet coordinator (PNC). The PNC forms a temporary piconet by transmitting a beacon, and provides a basic communication timing (i.e., network synchronization timing). More specifically, the PNC provides devices on a piconet with wireless communication services, such as QoS, synchronization, a power save mode and a media access control (MAC).

According to the IEEE 802.15.3 standard, a piconet is formed whenever needed, and a plurality of devices on the piconet share one media in a peer to peer fashion and communicate with each other based on a multihop wireless system.

As described above, a plurality of devices on the piconet communicate with each other through one media. Therefore, to avoid the occurrence of collision in communications between devices, it is required to control each device's access to a wireless media, and to allow the devices to communicate at proper timings.

The wireless media access over the PAN is largely divided into a collision-based system and a collision avoidance system. A typical example of the collision-based system is a CSMA-CA used for the IEEE 802.11. The merits of this system are that it is relatively simple and has a small overhead. However, if the node integration increases, the rate of occurrence of a collision is increased and as a result of this, the number of retransmission also increases.

A typical example of the collision avoidance system is a TDMA used in broadband wireless system like HiperLAN2. Although the TDMA is free of collision due to simultaneous accesses, its resources allocated to control traffic are not effectively used and could be wasted.

In particular, as the number of devices interconnected over the PAN increases, the wireless media access contention is increased. Thus, the problems of the collision-based or collision avoidance systems become worse, and the wireless media access is available to a few devices only. Also, the rate of the occurrence of a collision is increased because many devices attempt to access the media, and this results in the increase of the number of retransmission, only causing a vicious circle of more collisions and delay in transmission.

SUMMARY OF THE INVENTION

An aspect of the present invention is to provide a wireless media access method for preventing retransmission due to a high collision rate on a PAN (Personal Area Network) where node integration is high. In an exemplary embodiment of the present invention, the PAN is a WPAN (Wireless Personal Area Network).

To achieve the above-described aspect, there is provided a wireless media access method on a wireless network which is synchronized by a synchronizing signal broadcasted from a coordinator, the method comprising the steps of a) assigning priority to a plurality of devices interconnected over the wireless network for securing wireless resources in accordance with application characteristics of a packet to be transmitted, b) if the devices request communication, dividing at least one slot within a superframe into a plurality of minislots, and allocating the minislots to the devices, respectively, according to the priority, and c) inserting information about the allocated minislots in the synchronizing signal and broadcasting the information, thereby allowing each of the devices with the allocated minislots to exclusively use the allocated minislot for data communication.

The method further includes the step of d) if the allocated minislot is not used by the device with the priority for a predetermined amount of time, collecting the minislot and allocating the same to another device.

In an exemplary embodiment, the step d) includes the steps of, in the coordinator, transmitting to the device a beacon for confirming whether the minislot is used, if the device does not send a response to the beacon, collecting the minislot, and in the coordinator, allocating the minislot to the other device according to the priority.

The collected minislot is allocated to a device with the next highest priority. Also, the minislots are allocated sequentially from the front, in accordance with the priority thereof.

In an exemplary embodiment of the invention, the step for assigning priority to a plurality of devices for securing wireless resources in accordance with application characteristics of a packet to be transmitted includes the sub-steps of transmitting to the coordinator a profile including designated characteristics of each of the devices and an association request message, in the coordinator, assigning the priority to the devices on the basis of the profile, and in the coordinator, transmitting an association response message including the priority to each of the devices.

The profile comprises application characteristics of a data packet to be transmitted by the device, and a worst case packet transmission interval for the device to transmit the packet using the minislot.

In an exemplary embodiment, if the device does not use the minislot for the worst cast packet transmission interval, the coordinator transmits a beacon for confirming whether the minislot is used.

The coordinator groups the devices into a plurality of classifications, and assigns the same priority level to each of the devices belonging to the same group. Also, the minislots are respectively allocated to the groups according to the priority levels thereof, and one of devices belonging to each group obtains the minislot assigned to the group.

In an exemplary embodiment, if a new device is added to the network, the coordinator assigns to the device a next highest priority level of the existing priority level.

Another aspect of the invention provides a wireless media access method on a wireless network synchronized by a synchronizing signal broadcasted from a coordinator, the method comprising the steps of a) partitioning the wireless network with the devices to a plurality of subnetworks if a greater number of devices than a predetermined number are to be interconnected over the wireless network, and electing a sub-coordinator for managing each subnetwork to make each subnetwork independent of each other, b) allocating to each of the subnetworks one of the slots in a superframe, and assigning a priority level for securing wireless resources to the devices belonging to each subnetwork with respect to the allocated slot, c) dividing the allocated slot into minislots if the device requests communication, and allocating one of the minislots to the device according to the priority level, and d) in a beacon period, notifying the devices belonging to the subnetwork that the minislot is secured by the device, and thereby, allowing the device to exclusively use the minislot for data communication during a predetermined amount of time.

BRIEF DESCRIPTION OF THE DRAWINGS

The above aspects of the present invention will be more apparent by describing certain embodiments of the present invention with reference to the accompanying drawings, in which.

DETAILED DESCRIPTION OF EXEMPLARY EMBODIMENTS

Certain embodiments of the present invention will be described herein below with reference to the accompanying drawings.

Figure 1:
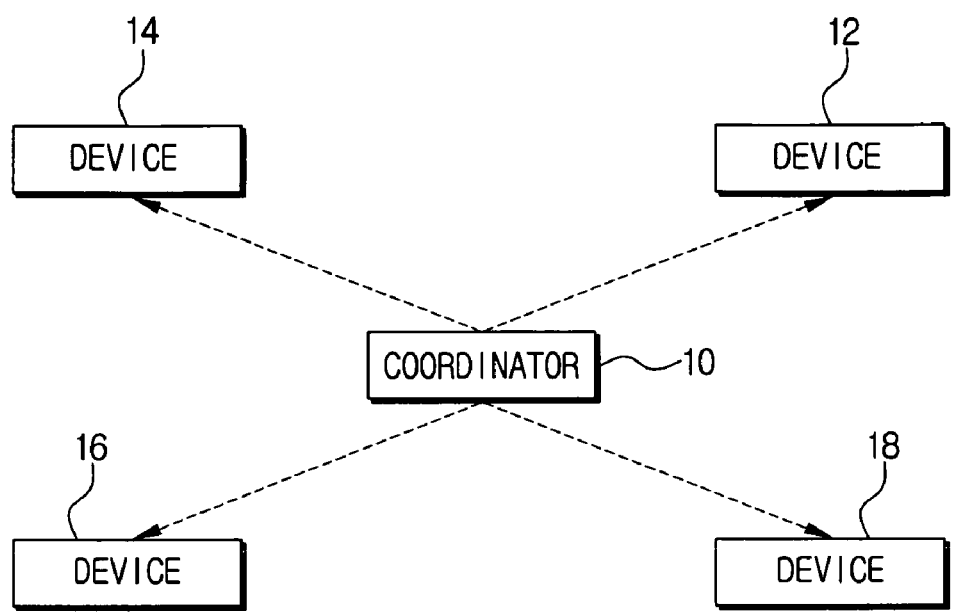
FIG. 1 is a block diagram illustrating a WPAN (wireless personal area network) to which a wireless media access method according to an exemplary embodiment of the present invention may be incorporated.

FIG. 1 diagrammatically illustrates a WPAN (wireless personal area network) on which a wireless media access method according to an exemplary embodiment of the present invention can be performed. Referring to FIG. 1, a plurality of devices 10 to 18 construct a WPAN, and one of the devices within the network is a coordinator 10. The coordinator 10 broadcasts a beacon frame (that is a synchronous signal) to the other devices 12, 14, 16, and 18, to synchronize the devices interconnected over the WPAN. It should be noticed that the four devices 12, 14, 16, and 18 and one coordinator 10 depicted in FIG. 1 are for illustrative only, and more or less devices can be interconnected over the WPAN.

Figure 2:
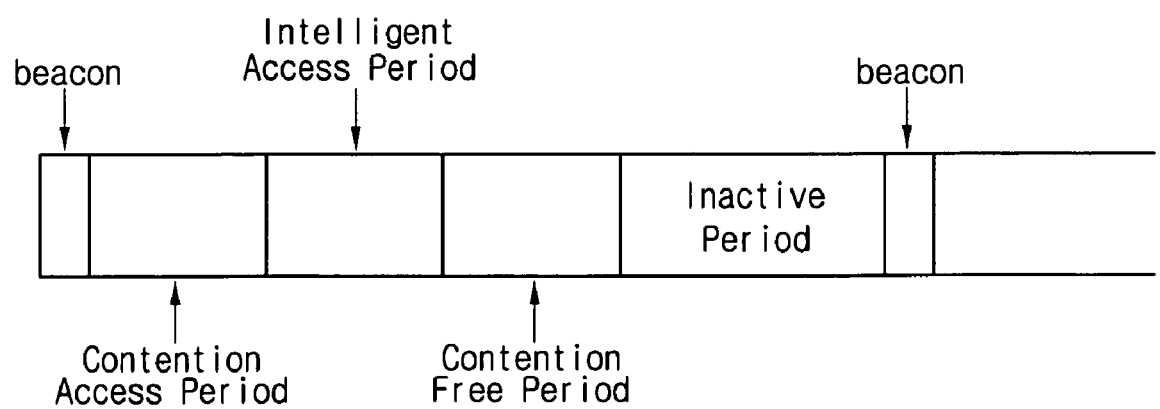
FIG. 2 illustrates the structure of a superframe used in a wireless media access method according to an exemplary embodiment of the present invention.
Figure 3:
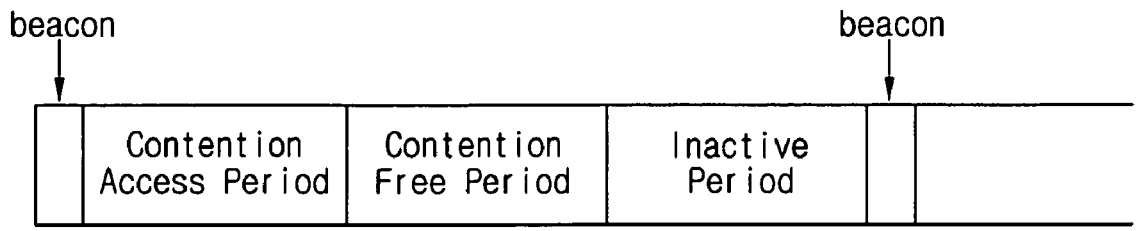
FIG. 3 illustrates the structure of a conventional superframe.

FIG. 2 illustrates the structure of a superframe used in a wireless media access method according to an embodiment of the present invention. As shown in FIG. 2, the superframe is composed of a beacon zone, a CAP (Contention Access Period), an IAP (Intelligent Access Period), a CFP. (Contention Free Period), and an inactive period. Compared with the superframe structure used in the related art wireless media access method illustrated in FIG. 3, the superframe of the present invention further includes the intelligent access period. The wireless media access method, according to an embodiment of the present invention, is performed in the IAP. More details of the IAP and the media allocation method will be described later.

Figure 4:
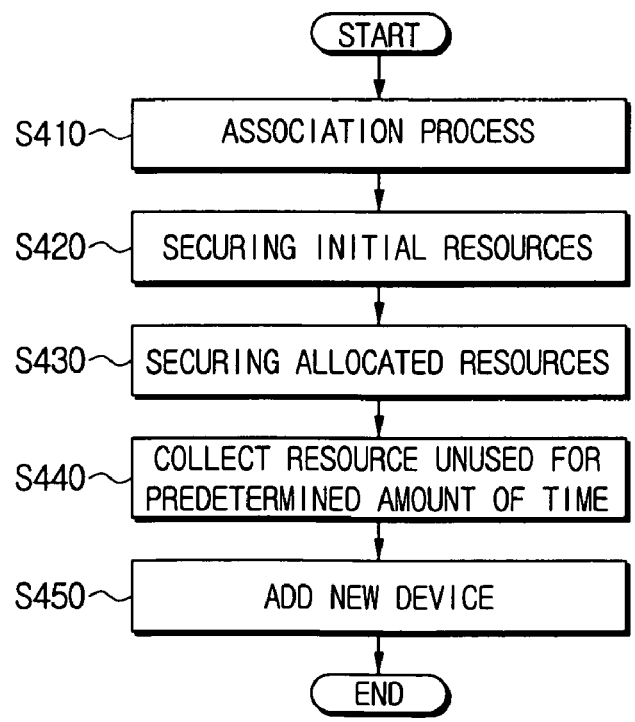
FIG. 4 is a flowchart describing a wireless media access method according to an exemplary embodiment of the present invention.

FIG. 4 is a flowchart describing a wireless media access method according to an embodiment of the present invention, and FIGS. 5 through 9 are explanatory diagrams for explaining each operation of FIG. 4. An embodiment of the present invention will be now explained with reference to FIGS. 4 through 9.

Figure 5:
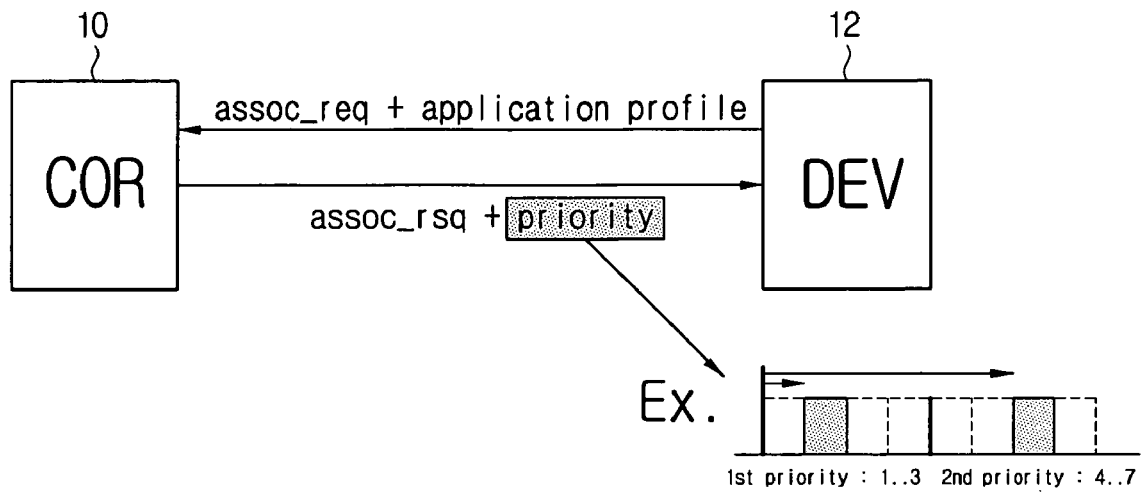
FIGS. 5 through 9 are explanatory diagrams for explaining each step of FIG. 4.

At first, an association process is performed (S410). The association process (S410) involves gathering devices to join the WPAN. Referring to FIG. 5, to join the WPAN, the device 12 should transfer an association request message and an application profile to the coordinator 10.

The application profile includes device characteristics, application characteristics of a data packet the device wants to transmit, and a worst case packet interval defined to allow the device to use resources that are initially secured. Then, the coordinator 10 assigns priority level to each device, respectively, on the basis of the application profile received from the devices. The devices are grouped into several groups, and the priority levels are given to the groups. In one exemplary embodiment, devices belonging to the same group naturally have the same priority level.

Figure 6:
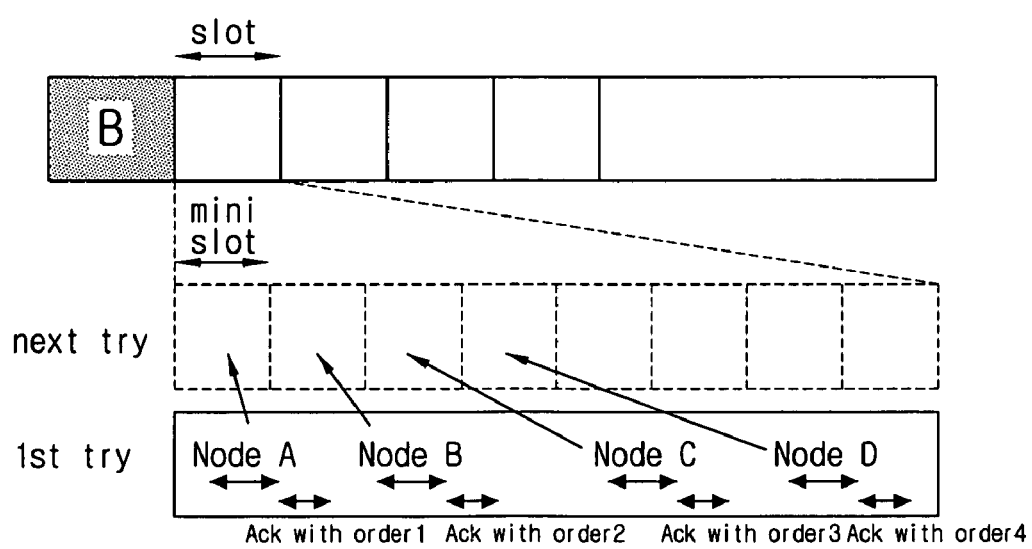

The coordinator 10 transfers to each device the priority level assigned and an association response message. The priority level affects the backoff window as a collision occurs while the devices are making the media access. Referring to FIG. 6, the opportunity for making the wireless media access is first given to the devices allocated with the priority level 1, or the highest priority, and then the devices allocated with the priority level 2 can make the access next. Other processes, except for the association process, are identical with the general procedure used in the WLAN or the WPAN.

The next operation is securing initial resources (S420). Referring to FIG. 6, the intelligent access period comprises a plurality of slots, and each slot comprises a plurality of minislots. As mentioned above, each device gets the opportunity for an access to the media according to the priority given at the association operation (S410). For example, if a device with a high priority and a device with a low priority request access to the media at the same time, the coordinator 10 allocates a minislot to the device with a high priority.

When the device with a high priority secures the minislot, the other devices in the same group with a high priority and devices in another group with the next highest priority compete with each other for a next minislot.

After allocating the minislots, the coordinator 10 notifies each device through the beacon as to what place the device is to obtain, and each device remembers the location of its minislot in the corresponding slot.

Figure 7:
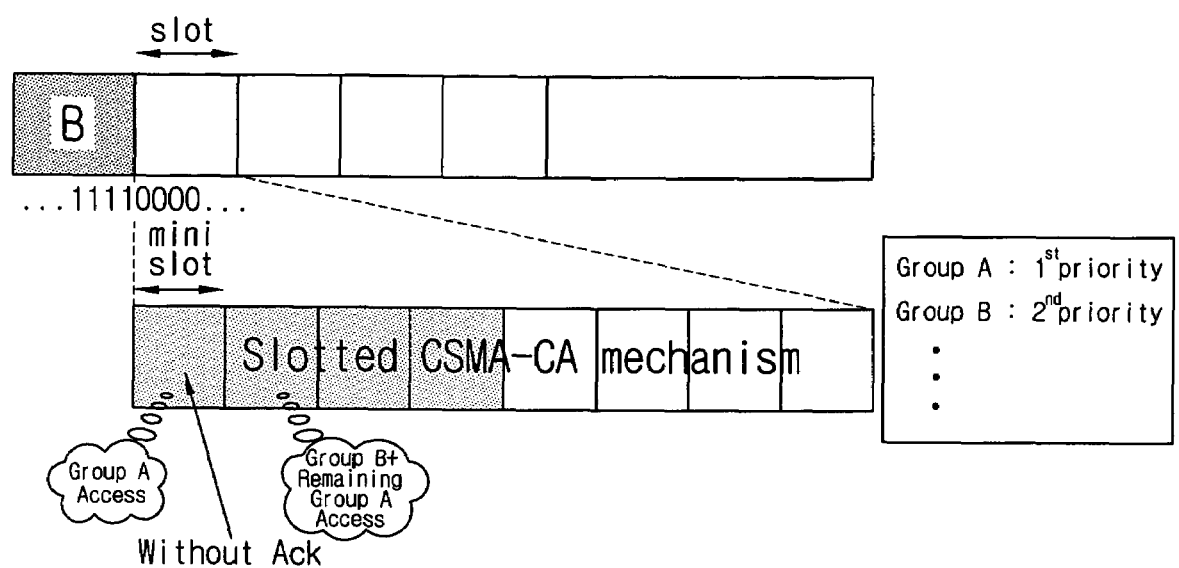

Then, the coordinator 10 secures the allocated resources for each device (S430). To this end, the coordinator 10 notifies, in the beacon zone, which minislot is being used and thus, prevents other devices from using the corresponding minislot. Also, the device accesses its own minislot for data transfer, so that collision between devices can be avoided. Referring to FIG. 7, the coordinator 10 transmits data such as "11110000..." in the beacon zone to each device in order to notify the devices that four minislots have been allocated in sequence. On receiving the data, some devices having no minislot allocated discover that those four minislots have already been allocated to other devices, and restrain themselves not to access to the media for those four minislots. Therefore, the devices having their allocated minislots can exclusively use them without causing any collision with other devices.

If the secured resources are not used for a certain amount of time, namely, the worst case packet transmission interval, they are given away to other devices, according to a predetermined resource return operation (S440). If the device having an allocated resource did not use the resource for the worst case packet interval, which is predetermined by the corresponding device, the coordinator 10 takes the resource back.

If the device does not perform data transmission in its own minislot for the predetermined worst case packet interval, the coordinator 10 notifies the corresponding device through the beacon that it is going to take the minislot back. If the device does not send a response despite the beacon transmission, the coordinator 10 proceeds to collect the corresponding minislot anyway, and gives it away to another device.

Figure 8:
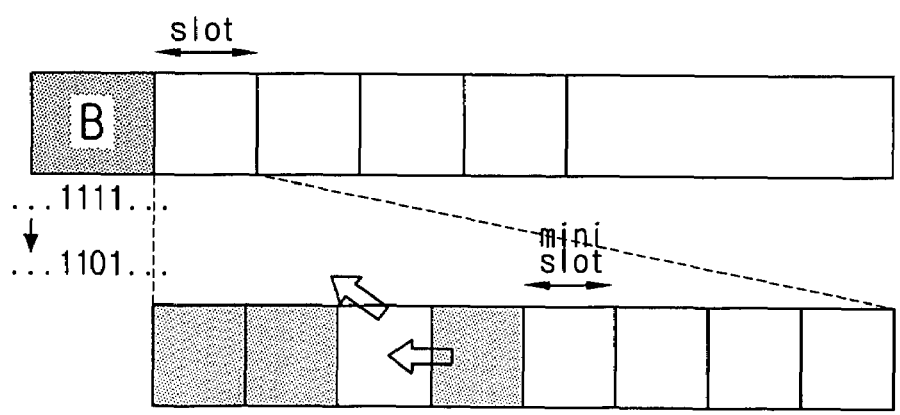

Referring to FIG. 8, a third minislot of the slot is taken back, and the coordinator 10 transmits a data "11010000..." to each device, notifying the devices that the third minislot is now available. Therefore, as shown in FIG. 8, other devices having their own minislots, where the minislots have lower priorities than the third minislot collected from the same slot, move forward one minislot at a time so that the minislots can be used in sequence from the front. In the meantime, the minislots that are not yet allocated are given to other devices making a new attempt for media access.

Figure 9:
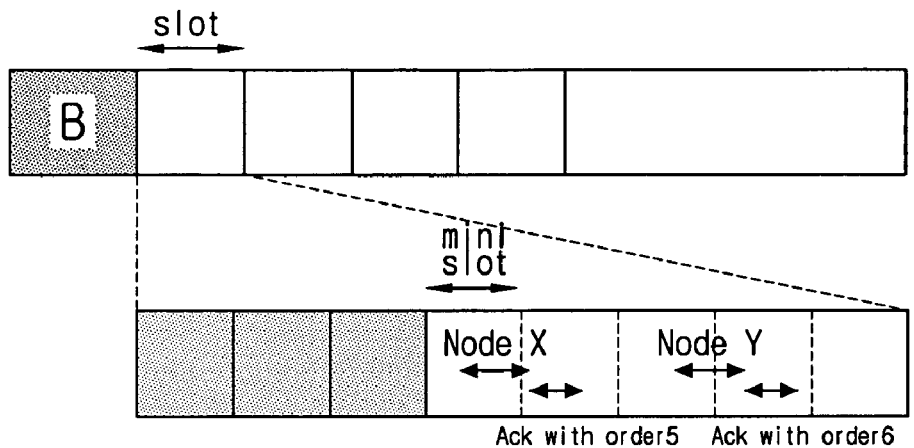

Referring now to FIG. 9, this Figure shows securing a resource for a new device that makes an attempt for media access is conducted (S450). In other words, if a new device is added to the network and the new device wants to transmit data through media access, it should follow the above-described procedure (S410-S430) to secure resources. In this case, however, it is important to assign a proper priority level to the device, so that no collision occurs with minislots already secured by existing devices. In other words, a newly added device receives a lower priority level than that of the existing devices. Except for this, the same procedure (S410-S430) is repeated for the new device to make the media access.

Figure 10:
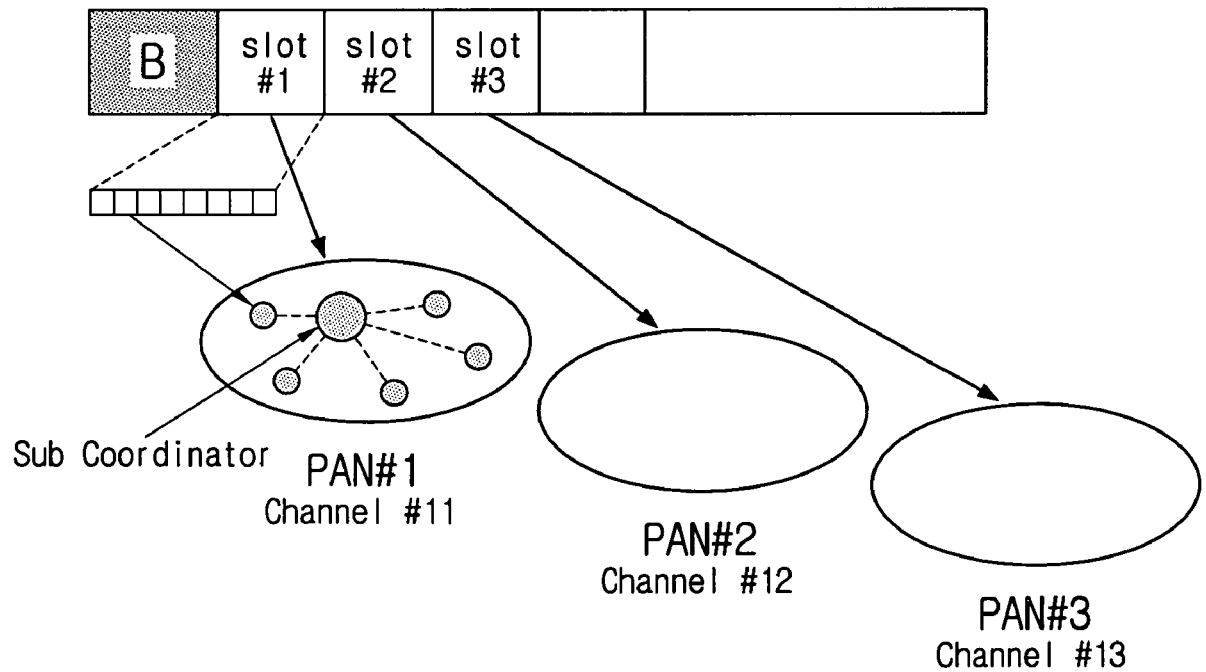
FIG. 10 is an explanatory diagram for explaining a method for partitioning and managing a PAN according to an exemplary embodiment of the present invention.

FIG. 10 is a diagram for explaining a method for partitioning and administrating a PAN according to an embodiment of the present invention. As shown in FIG. 10, when the degree of integration on the WPAN is very high, the WPAN can be partitioned to a plurality of subnetworks and be managed.

That is, in the operation S410, the coordinator places devices into a plurality of subnetworks based on the information such as the application profile of the devices, and elects a subcoordinator acting as an administrator for each subnetwork.

In addition, the coordinator allocates each slot in the intelligent access period to each subnetwork. Each subnetwork is managed by a subcoordinator of each group. The role of the subcoordinator is the same with that of the coordinator, namely, assigning priority to devices on the subnetwork under its administration, securing minislots according to priorities, and collecting unused minislots.

In short, the subcoordinators manage subnetworks, respectively, and the coordinator manages all of the personal area subnetworks. Therefore, a network having a high degree of integration can be managed more effectively.

If the degree of integration of the WPAN is not high, the existing CSMA-CA method can be used. However, if the number of devices interconnected on a network increases, and the degree of integration over the network increases, the wireless media access method according to an embodiment of the present invention can be applied to more effectively manage the network.

As described above, for securing initial resources in the PAN environment with high integration, the wireless media access method of the invention can be advantageously used for adjusting the access frequency for each group according to the priority. As a result of this, collisions can be reduced, which occur when many nodes try to access wireless media at the same time. Additionally, the secured resources can be returned to the coordinator without causing additional control traffic. Further, since the secured resources can be recycled immediately, wireless resources are managed more effectively.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A wireless media access method on a wireless network synchronized by a synchronizing signal broadcast from a coordinator, the method comprising:
   a) assigning priority to a plurality of devices interconnected over the wireless network for securing wireless resources in accordance with application characteristics of a packet to be transmitted;
   b) if at least some of the devices request communication, dividing at least one slot within a superframe into a plurality of minislots and allocating the minislots to the devices, respectively, according to the priority; and
   c) inserting information about the allocated minislots in the synchronizing signal and broadcasting the information, thereby allowing each of the devices having the allocated minislots to exclusively use the allocated minislots for data communication.

2. The method according to claim 1, further comprising:
   d) if one of said allocated minislots is not used by one of said devices for a predetermined amount of time, collecting the allocated minislot and allocating the allocated minislot to another of said devices.

3. The method according to claim 2, wherein the step d) comprises:
   transmitting to said one of said devices a beacon for confirming whether the allocated minislot is used;
   collecting the allocated minislot if said one of said devices does not send a response to the beacon; and
   allocating the allocated minislot to the other of said devices.

4. The method according to claim 3, wherein said other device, to which the allocated minislot is allocated, has the next highest priority.

5. The method according to claim 3, wherein at least one of said transmitting and allocating steps, of step d), is performed by the coordinator.

6. The method according to claim 1, wherein the minislots are allocated sequentially from the front, in accordance with the priority.

7. The method according to claim 1, wherein the step a) comprises:
transmitting to the coordinator a profile including designated characteristics of each of the devices and an association request message;
assigning the priority to the devices on the basis of the profile; and
transmitting an association response message including the priority to each of the devices.

8. The method according to claim 7, wherein at least one of the assigning and transmitting steps, of step a), is performed by the coordinator.

9. The method according to claim 7, wherein the profiles of the devices comprise application characteristics of a data packet to be transmitted by the devices.

10. The method according to claim 7, wherein the profiles of the devices comprise a worst case packet transmission interval for the devices to transmit the packet using the appropriate allocated minislot.

11. The method according to claim 10, wherein if one of the devices does not use the appropriate allocated minislot for the worst cast packet transmission interval, the coordinator transmits a beacon confirming whether the appropriate allocated minislot is used.

12. The method according to claim 1, wherein the coordinator classifies the devices into a plurality of groups and assigns a same priority level to each of the devices belonging to the same group.

13. The method according to claim 12, wherein the minislots are respectively allocated to the groups according to the priority levels, and one of said devices belonging to each group obtains the minislot assigned to the group.

14. The method according to claim 1, wherein, if a new device is added to the network, the coordinator assigns to the device a next highest priority level of the assigning priority.

15. The method according to claim 1, wherein the wireless network is a wireless personal area network.

16. A wireless media access method on a wireless network synchronized by a synchronizing signal broadcast from a coordinator, the method comprising:
a) if a greater number of devices than a predetermined number are to be interconnected over the wireless network, partitioning the wireless network into a plurality of subnetworks, and assigning a subcoordinator for managing each subnetwork to make each subnetwork independent of each other;
b) allocating to each of the subnetworks one of slots in a superframe, and assigning a priority level for securing wireless resources to the devices belonging to each subnetwork with respect to the allocated slot;
c) if one of the devices requests communication, dividing the allocated slot for said one of said devices into minislots, and allocating one of the minislots to said one of said devices according to the priority level; and
d) in a beacon period, notifying the devices belonging to the subnetwork that the allocated minislot is secured by said one of said devices, and thereby, allowing said one of said devices to exclusively use the allocated minislot for data communication during a predetermined amount of time.

17. The method according to claim 16, wherein the wireless network is a wireless personal area network.

18. The method according to claim 16, further comprising:
e) if said allocated minislot is not used by said one of said devices for said predetermined amount of time, collecting the allocated minislot and allocating the allocated minislot to another of said devices.

19. The method according to claim 18, wherein the step e) comprises:
transmitting to said one of said devices a beacon for confirming whether the allocated minislot is used;
collecting the allocated minislot if said one of said devices does not send a response to the beacon; and
allocating the allocated minislot to the other of said devices.

20. The method according to claim 16, wherein if said one of said devices does not use the allocated minislot for a worst cast packet transmission interval, at least one of the coordinator and subcoordinator transmits a beacon confirming whether the appropriate allocated minislot is used.

* * * * *